United States Patent
Bihuniak et al.

[11] Patent Number: 5,928,397
[45] Date of Patent: Jul. 27, 1999

[54] METHOD TO PRODUCE FUSED QUARTZ PARTICULATES

[76] Inventors: Peter P. Bihuniak, 631 Scenic Cir., Holland, Ohio 43528; Harry B. Shimp, 30 Sterncrest Dr., Chagrin Falls, Ohio 44022; Steven M. White, 1800 Canterbury Dr., Morristown, Tenn. 37814

[21] Appl. No.: 09/084,344

[22] Filed: May 26, 1998

[51] Int. Cl.$^6$ .......................... C03B 19/00; C03B 19/10
[52] U.S. Cl. .................. 65/21.1; 65/21.5; 65/32.5; 65/66; 65/116; 65/126; 65/135.6; 65/137; 65/142; 65/DIG. 8
[58] Field of Search ..................... 65/21.1, 21.2, 65/21.5, 66, 83, 137, 141, 142, 32.1, 32.5, 116, 126, 135.6, 136.4, DIG. 8; 264/5, 13, 14

[56] References Cited

U.S. PATENT DOCUMENTS

| | | |
|---|---|---|
| 2,137,931 | 11/1938 | Craven, Jr. et al. . |
| 2,780,889 | 2/1957 | Fulk . |
| 3,310,391 | 3/1967 | Law . |
| 3,313,608 | 4/1967 | Guyer et al. . |
| 3,495,961 | 2/1970 | Lange . |
| 3,764,286 | 10/1973 | Antczak et al. . |
| 3,833,354 | 9/1974 | Thummler et al. . |
| 3,843,340 | 10/1974 | Cone . |
| 3,997,310 | 12/1976 | Cone . |
| 4,002,446 | 1/1977 | Hammel et al. . |
| 4,217,462 | 8/1980 | Rawles et al. . |
| 4,329,164 | 5/1982 | Kilian et al. . |
| 5,026,413 | 6/1991 | Lebert et al. . |

*Primary Examiner*—Steven P. Griffin
*Attorney, Agent, or Firm*—John F. McDevitt

[57] ABSTRACT

A method to produce fused quartz particulates from quartz sand is disclosed employing continuous withdrawal of the molten material from a furnace apparatus. The molten material is rapidly cooled as withdrawn causing thermal fracture which is followed by mechanically pulverizing the fragments to a desired particle size.

15 Claims, 1 Drawing Sheet

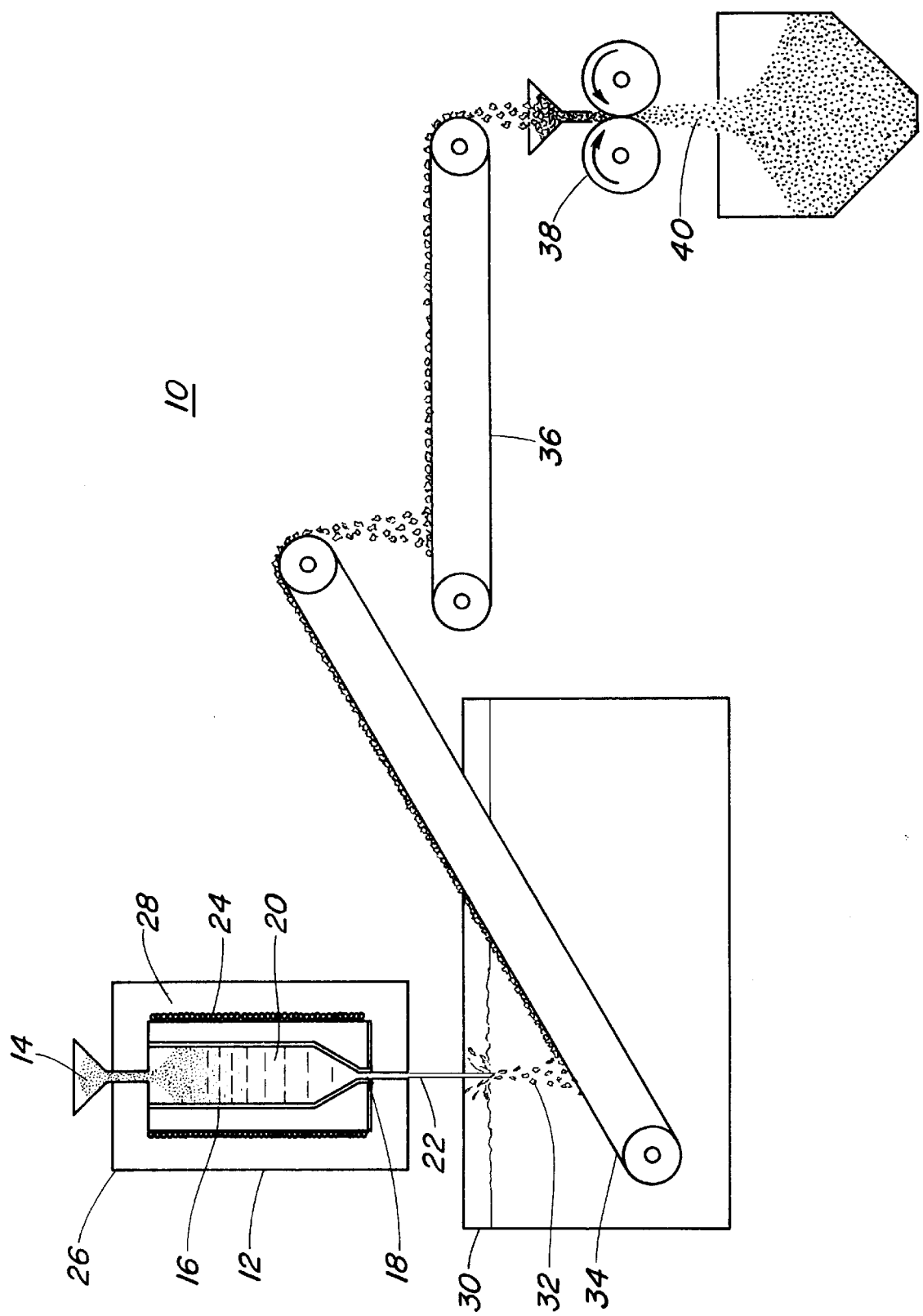

METHOD TO PRODUCE FUSED QUARTZ PARTICULATES

BACKGROUND OF THE INVENTION

This invention relates generally to a method for preparation of fused quartz particulates from quartz sand and more particularly to a novel process whereby this product can be produced continuously in a far more effective manner.

Fused quartz particulates or granules are widely used in various diverse product applications including investment casting, refractories, electronic encapsulants, composite fillers, resin fillers and still other products. Typical characteristics for such granular fused quartz material now being manufactured for resin filler, refractory and investment casting applications include a 99.7% $SiO_2$ content, apparent specific gravity in the range 2.16–2.20, a coefficient of linear thermal expansion in the range $0.5–0.6 \times 10^{-6}$ /° C. (20–700° C.), along with varying particle size distributions ranging from 10–325 mesh United States screen size depending upon the particular product specification. The conventional manufacturing process for this type fused quartz material is a non-continuous procedure whereby a batch of the starting mineral sand becomes fused in a rotary electric arc furnace. A description of the conventional furnace and fusion process is contained in U.S. Pat. No. 4,217,462 which can now produce fused quartz ingots as large as 7500 pounds in size accompanied by a considerable ingot "skin" of the unmelted sand which can be a considerable portion of the initial batch charge. Such inherent inefficiency in the current manufacturing process understandably necessitates recycling of the unmelted sand as well as contributes to assorted environmental problems accompanying eventual recovery. Additionally, the cost of large equipment needed to handle and pulverize such large size ingots on a non-continuous basis represents still another serious drawback in the current manufacturing process.

It is also known to manufacture fused quartz rod, ribbon and tubing in a continuous manner from purified quartz sand being fed to a suitable furnace apparatus. Various furnace equipment for this purpose are disclosed in U.S. Pat. Nos. 3,764,286 and 5,026,413 which both employ a refractory metal melting crucible heated electrically by resistance or induction heating means. The molten fused quartz material formed in said crucible member is continuously withdrawn therefrom through a bottom opening while being allowed to slowly cool to ambient temperatures as an elongated solid member (rod, tubing or ribbon). Both prior art patents further mention the employment of a mechanical drawing machine to facilitate continuous removal of the solidifying material. As still further disclosed in both prior art patents, the resulting solid fused quartz product is said to be essentially bubble free with the earlier issued patent pointing out employment of particular furnace reducing gas atmospheres said to enhance bubble removal.

It is one object of the present invention to now provide an improved method whereby fused quartz particulates can be formed in a manner essentially avoiding the above enumerated drawbacks associated with the current manufacturing process.

It is another object of the present invention to provide a novel method enabling continuous formation of said fused quartz particulates at reduced equipment costs.

Still another object of the present invention is to provide a novel method for preparation of fused quartz particulates which employs a thermal fracturing mechanism in producing the desired results.

These and still further objects of the present invention will become more apparent upon considering the following detailed description of the present invention.

SUMMARY OF THE INVENTION

A novel method has been discovered for manufacture of fused quartz particulates having physical characteristics comparable to that above pointed out in a far more continuous mode of preparation. More particularly, conventional quartz sand is first continuously fed to a suitable melting furnace of the type above described for continuous removal therefrom as an elongated solid member that is then subjected to a suitable cooling medium before being allowed to cool substantially in the surrounding ambient atmosphere. The drastic thermal shock encountered by said heated solid member when placed in physical contact with conventional cooling means, such as chill rods, or by being immersed in a cooling liquid, such as tap water, causes immediate fracture of said member into a plurality of fragments. These fragments can then be continuously transported to conventional mechanical pulverizing means, such as roll crushers, hammer mills and the like, for reduction of physical particle size in the customary manner. In one embodiment for continuous mechanical size reduction of the thermally fractured fragments, conventional container means provided with a suitable liquid coolant further includes mechanical conveyor means connected thereto for continuous transport of the fused quartz fragments as formed to the selected pulverizing equipment where a desired particle size can be achieved.

In a further representative embodiment of the present preparation process, the already known operating conditions being maintained in the aforementioned melting furnace are carried out in a manner so as to enhance rather than reduce bubble content in the fused quartz material being continuously withdrawn therefrom. By so doing, a higher bubble content as well as a more pronounced ridge or striae condition in the elongated solid member results for greater thermal fracture of said material when rapidly cooled from the extremely elevated temperatures of furnace operation. In accordance therewith, it becomes now possible to simply quench the molten fused material in a water bath where it becomes immediately shattered into small pieces that are suitable for direct introduction to the selected equipment for pulverization. A roll crusher can be used for said purpose in producing a final acceptable particle size with subsequent conventional classifying techniques also being employed to satisfy a particular product application. Optional magnetic separator means can also be employed during processing of the pulverized fused quartz particulates in the foregoing manner to further assist with removal of any entrained metal contaminants in the pulverized material.

BRIEF DESCRIPTION OF THE DRAWING

The accompanying drawing is a schematic flow diagram depicting representative processing equipment for practicing the method of the present invention.

DETAILED DESCRIPTION OF THE PREFERRED EMBODIMENTS

Referring to the accompanying drawing, there is depicted representative processing equipment for carrying out the method of the present invention. More particularly, said drawing includes schematic views of typical manufacturing equipment being employed to conduct a continuous preparation of the granulated fused quartz material from quartz sand feedstock together with the processing steps being undertaken to do so. Accordingly, said combined equipment and process flow chart 10 first utilizes a known type melting furnace 12 of the same general construction described in the previously cited prior art patents to fuse mineral quartz sand 14 being fed thereto in a continuous manner. Said referenced furnace apparatus includes a refractory metal crucible 16 having a bottom orifice 18 through which the molten quartz 20 is continuously withdrawn from the furnace as a semi-solid ribbon 22. Electrical induction or resistance heating means 24 supply the electrical energy needed for melting of the feedstock in said crucible member with the heating arrangement further being encased in a refractory jacket 26 so that the melting step can be carried out in a reducing gas atmosphere 28 (not shown) being introduced thereto. Melting of quartz sand in such manner permits numerous bubbles and other physical discontinuities, such as striae, ridges, grain structures and the like to form in the fused quartz ribbon 22 being continuously removed from the furnace apparatus 12 thereby enhancing its subsequent thermal fracture according to the present method. Said heated fused quartz ribbon 22 is next continuously immersed in a container of cooling water 30 causing immediate thermal-shock sufficient to shatter said member into a plurality of relatively small pieces 32. Said thermally fractured material 32 is continuously collected by a conventional drag conveyor 34 physically disposed within the cooling water container 30 to do so and thereafter continuously transported by such equipment means to a second conveyor means 36 continuously feeding said fractured material to a roll crusher 38 for further continuous mechanical reduction in physical particle size of the furnished material. The pulverized quartz particulates 40 being continuously formed in such manner can thereafter be classified by conventional screening means (not shown) for separation into the desired particle size for a particular product application as previously mentioned. Likewise, optional magnetic separator means (also not shown) can also be employed during processing for removal of any entrained metal contaminants from the pulverized final product.

It will be apparent from the foregoing description that a broadly useful and novel method has been provided enabling fused quartz particulates to now be produced in a more effective manner accompanied by lower equipment costs. It is contemplated that the present process can be further applied to still other fused minerals being prepared in granular form such as magnesium oxide and silicon carbide where extremely elevated melting temperatures of 2500° C. and higher will be required. Likewise, it is also contemplated that still other known furnace apparatus than herein specifically disclosed can be used in carrying out the present process along with substitution of still other commercially available pulverizing means than herein disclosed being employed for granulation of the fused mineral. Consequently, it is intended to cover all modifications of the claimed process which may be devised by those skilled in the art as falling within the true spirit and scope of the present invention.

What we claim as new and desire to secure by Letters Patent of the United States is:

1. A method of forming fused quartz particulates which comprises:

(a) continuously feeding quartz sand to a furnace apparatus having a heated crucible from which molten fused quartz is continuously withdrawn as an elongated solid member at elevated temperatures, (b) subjecting the elongated solid fused quartz member as withdrawn to rapid cooling in a manner causing thermal fracture of said member into a plurality of fragments, and (c) further reducing the physical size of the fused quartz fragments by mechanical pulverizing means to produce a desired particle size.

2. The method of claim 1 wherein the furnace apparatus is heated with induction heating means.

3. The method of claim 1 wherein the furnace apparatus is heated with resistance heating means.

4. The method of claim 1 wherein the heated crucible is a refractory metal crucible.

5. The method of claim 1 wherein the crucible includes a bottom opening from which the fused quartz member is withdrawn.

6. The method of claim 1 wherein the furnace apparatus includes a reducing atmosphere.

7. The method of claim 1 wherein the furnace apparatus further includes mechanical drawing means.

8. The method of claim 1 wherein the solid quartz member is cooled as withdrawn by physical contact with mechanical cooling means.

9. The method of claim 1 wherein the elongated fused quartz member is cooled as withdrawn by physical immersion in a cooling liquid.

10. A method of forming fused quartz particulates which comprises:

(a) continuously feeding quartz sand to a furnace apparatus having a heated crucible from which molten fused quartz is continuously withdrawn as an elongated solid member at elevated temperatures, (b) subjecting the elongated solid fused quartz member as withdrawn to a rapid cooling in a manner causing thermal fracture of said member into a plurality of fragments, (c) continuously transporting the fused quartz fragments by mechanical conveyor means to mechanical means for further physical size reduction of said fragments, and (d) continuously pulverizing the fused quartz fragments with said mechanical means to produce a desired particle size.

11. The method of claim 10 wherein the crucible includes a bottom opening from which the elongated fused quartz member is withdrawn.

12. The method of claim 10 wherein the furnace apparatus further includes mechanical drawing means.

13. A method of forming fused quartz particulates which comprises:

(a) continuously feeding quartz sand to a furnace apparatus having a heated crucible provided with a bottom opening from which molten fused quartz is continuously withdrawn as a solid ribbon at elevated temperatures, (b) physically immersing the solid fused quartz ribbon as withdrawn in a cooling liquid stored in container means to cause thermal fracture of said fused quartz ribbon into a plurality of fragments, (c) continuously transporting the fused quartz fragments by mechanical conveyor means physically connected to said container means for passage to associated mechanical means for further physical size reduction of said fragments, and (d) continuously pulverizing the fused quartz fragments with said associated mechanical means to produce a desired particle size.

14. The method of claim 13 wherein the associated mechanical means employs crushing rolls.

15. The method of claim 13 which further includes removal of entrained metal contaminants in the pulverized fused quartz particles employing magnetic means.

* * * * *